United States Patent
Kunze et al.

(10) Patent No.: US 6,680,895 B1
(45) Date of Patent: Jan. 20, 2004

(54) CHANGER DEVICE FOR DISC-SHAPED DATA CARRIERS WITH A WORM GEAR HAVING DIFFERENT SLOPES

(75) Inventors: Norbert Kunze, Diez (DE); Stefan Müller, Wetzlar (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/674,614
(22) PCT Filed: Mar. 10, 2000
(86) PCT No.: PCT/EP00/02187
§ 371 (c)(1), (2), (4) Date: Nov. 2, 2000
(87) PCT Pub. No.: WO00/54272
PCT Pub. Date: Sep. 14, 2000

(30) Foreign Application Priority Data

Mar. 11, 1999 (DE) .......................................... 199 10 673

(51) Int. Cl.[7] ................................................ G11B 17/22
(52) U.S. Cl. ...................................................... 369/191
(58) Field of Search ............................. 369/191, 30.84, 369/30.85, 244; 360/98.04, 98.05, 98.06

(56) References Cited

U.S. PATENT DOCUMENTS 5,481,513 A * 1/1996 Takamatsu et al. ...... 369/30.84
5,586,103 A * 12/1996 Takamatsu et al. ......... 369/244
5,862,109 A * 1/1999 Nakamichi ............... 369/30.85
6,507,542 B1 * 1/2003 Hopf et al. ............... 369/30.85

FOREIGN PATENT DOCUMENTS

EP 813196 A2 * 12/1997

* cited by examiner

Primary Examiner—Tianjie Chen
(74) Attorney, Agent, or Firm—Michael E. Belk

(57) ABSTRACT

The invention relates to a device for playing and storing several disc-shaped data carriers to be operated alternately, in particular CDs, CD-ROMs, and DVDs, with a playback unit designed for playing the data carrier and comprising a base plate (5) and a frame (6) which are coupled to one another by means of springs and/or dampers, and comprising a turntable (13) arranged on the frame (6) and designed for accommodating the data carrier and a pressure device for pressing the data carrier onto the turntable (13), while a stacking unit is provided for the intermediate storage of several data carriers, and a loading device is provided for the bidirectional transport of the data carrier between the stacking unit and the playback unit as well as for moving the data carrier into and out of the device. The playback unit is displaceable by means of a worm gear (1) and can be locked in several positions.

20 Claims, 4 Drawing Sheets

CHANGER DEVICE FOR DISC-SHAPED DATA CARRIERS WITH A WORM GEAR HAVING DIFFERENT SLOPES

BACKGROUND OF THE INVENTION

The invention relates to a device for playing and storing several disc-shaped data carriers to be operated alternately, in particular CDs, CD-ROMs, and DVDs, with a playback unit designed for playing the data carrier and comprising a base plate and a frame which are coupled to one another by means of springs and/or dampers, and comprising a turntable arranged on the frame and designed for accommodating the data carrier and a pressure device for pressing the data carrier onto the turntable, while a stacking unit is provided for the intermediate storage of several data carriers, and a loading device is provided for the bidirectional transport of the data carrier between the stacking unit and the playback unit as well as for moving the data carrier into and out of the device.

Usually, a stacking unit for accommodating several data carriers, a playback unit on which one of the data carriers can be positioned each time for the purpose of reading or writing of the data, and a loading device for the transport of the data carriers are present in such a device. Given the requirement of a compact construction of the device, the present state of the art is such that the stacking unit stores the individual data carriers one above the other, that the reading or writing operation takes place in one and the same region which lies within the transport range of the data carrier during the selection of the data carrier to be read or written, and that accordingly the playback unit is displaced relative to the stacking unit before the selection of the data carrier to be read or written so as to clear the space for the stacking movement. The present state of the art is furthermore such that the playback unit consists of a base plate and a frame connected thereto by means of springs and dampers, which frame comprises the devices for driving the read/write device and the means for rotating and pressing the data carrier on a turntable. It is also known that the frame is locked with respect to the base plate while the data carrier is laid on or taken from the playback unit by a loading device in a CD player, so that the transfer of the data carrier to the playback unit or to the charging unit (in the reverse operation) is made easier.

SUMMARY OF THE INVENTION

It is an object of the present invention to provide a drive for the transport of the playback unit which is inexpensive and simple, and which nevertheless renders possible a fast and accurate positioning and locking of the playback unit in several positions in the device.

According to the invention, this object is achieved in a device for playing and storing several disc-shaped data carriers to be operated alternately, in particular CDs, CD-ROMs, and DVDs, with a playback unit designed for playing the data carrier and comprising a base plate and a frame which are coupled to one another by means of springs and/or dampers, and comprising a turntable designed for accommodating the data carrier and a pressure device for pressing the data carrier onto the turntable, while a stacking unit is provided for the intermediate storage of several data carriers, and a loading device is provided for the bidirectional transport of the data carrier between the stacking unit and the playback unit as well as for moving the data carrier into and out of the device, in that the playback unit is movable by means of a worm gear and can be locked in several positions.

The advantage of the use of the worm gear lies in the exact positioning possibility which can be achieved by means of the slope of the worm gear. In addition, the worm gear is mechanically robust, provides a compact construction, and is capable of transporting several slides simultaneously.

In an embodiment of the invention, the worm gear comprises a continuous thread with several ranges having different thread slopes, suitable for varying the speed of the translatory movements in dependence on the position of the playback unit at a constant worm gear rotation speed, or even stopping said movement completely.

This offers the advantage that the worm gear can always rotate at the same speed, so that an expensive drive providing a variable rotation speed can be dispensed with.

In a further embodiment of the invention, a control slide is displaced by the thread of the worm gear, which slide can be locked to the playback unit, so that the control slide and the playback unit are jointly moved by the thread of the worm gear, and the playback unit itself is retained by interlocking shapes in the device when the locking between the control slide and the playback unit islifted, while the control slide still remains movable on its own and can accordingly be displaced relative to the playback unit, performing switching functions inside the playback unit.

It is possible with this advantageous embodiment for one control slide to suffice both for moving the playback unit and for carrying out further switching functions in the device.

In a further embodiment of the device, the device is provided with a retaining catch for the control slide and the playback unit which is constructed such that it alternately inhibits and releases the movement of the control slide relative to the playback unit or the movement possibility of the playback unit relative to the entire device.

It is safeguarded thereby that the playback unit can only move if the control slide is locked thereto. When the control slide is carrying out switching movements while it is not connected to the playback unit, an undesirable movement of the playback unit is excluded.

It is furthermore provided that the control slide has contours which control the pressure device for the data carrier in the case of a movement relative to the playback unit and which inhibit the movement possibility between the base plate and the frame plate, which is limited by the spring-damper system only, and reduce the distance between the base plate and the frame.

This renders it possible to actuate also the functions of the pressure device by means of the control slide without any further drive such as, for example, a servo drive being necessary for this.

In a further embodiment of the invention, the control slide has a contour which controls the retaining catch in the case of a movement relative to the playback unit.

The control slide can thus advantageously also control the retaining catch, so that a further drive can be dispensed with.

It is in addition provided that the device is provided with a switch for electronic position detection which is integrated in the drive mechanism of the worm gear, or is controlled by the worm gear, or is controlled by the displacement of the control slide.

This offers the advantage that the instantaneous position of the worm gear or the control slide can be made available to the electronic circuits in the device according to the invention by means of an electrical signal.

It is in addition provided that a positioning mechanism is fitted with the features according to the invention as mentioned above.

An embodiment of the invention will be explained in more detail below with reference to the drawings, in which:

DETAILED DESCRIPTION OF THE PREFERRED EMBODIMENTS

Figure 1:
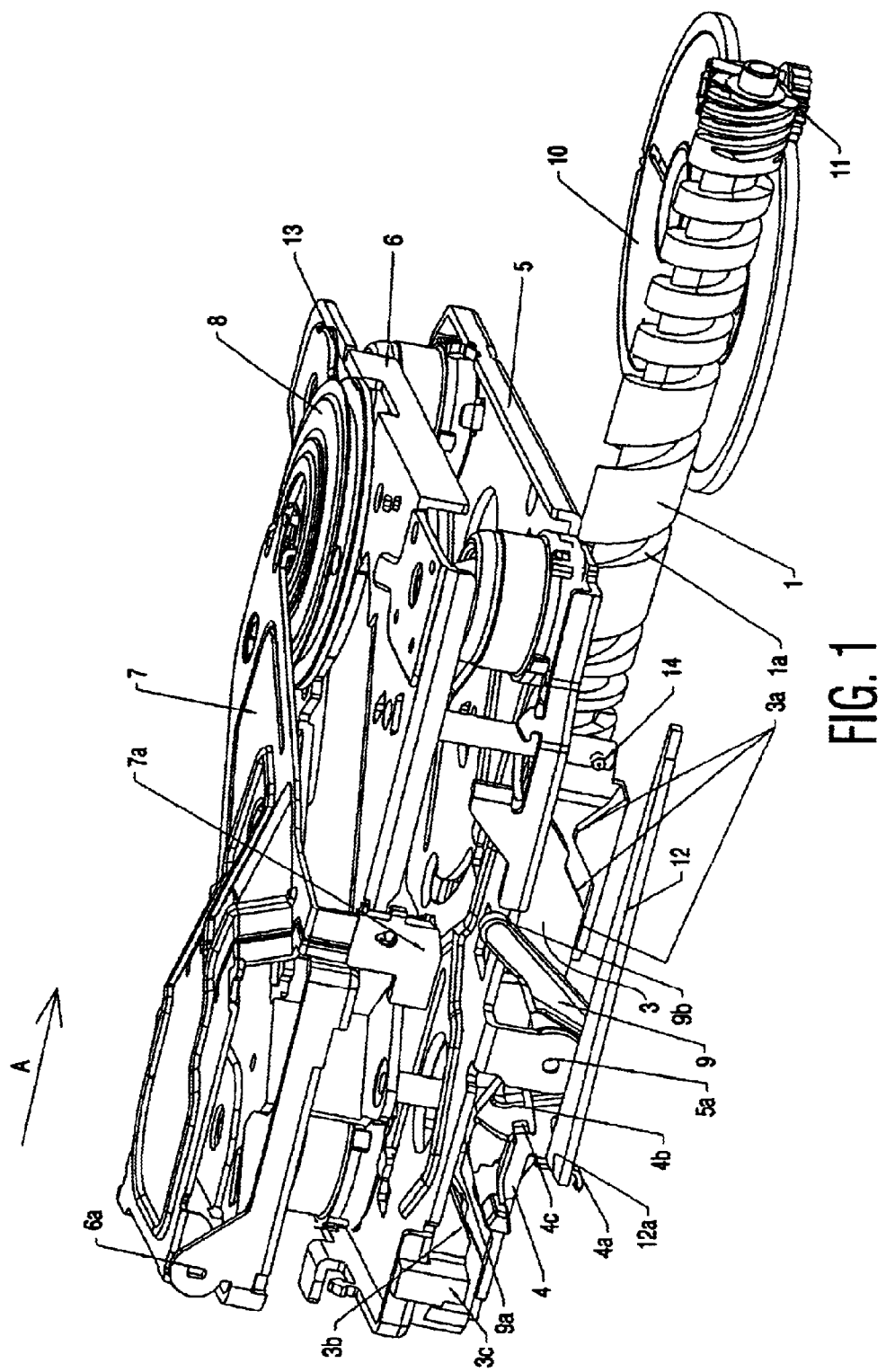
FIG. 1 is a perspective view of a drive unit.

The drive unit shown in FIG. 1 comprises a control slide 3, a worm gear 1 with a thread 1a having different slopes in different regions, and a catch 4 in a position in which the drive unit is locked against a locking contour 12 which forms part of the device, while a CD (not shown) is pressed onto the turntable 13 by the pressure device. The locking of the playback unit to the locking contour 12 is achieved in the direction of an arrow A by means of a tongue 4a of the catch 4 which lies in front of the edge 12a. The catch 4 is rotatably journaled in point 5a of the base plate. A locking in the direction opposed to the arrow A is achieved by a fixed detent (not shown) in the device. The pressure device for the CD is rotated about a point 6a of the frame in the direction of the turntable 13 by a spring (not shown), thus clamping the CD between the turntable 13 and the pressure disc 8. An operational track 9a of the opening lever 9 for this purpose is not in contact with the slope 3b of the control slide 3, so that the lifting arm 9b of the opening lever 9 does not bear on the lifting block 7a of the pressure bracket. In addition, the control slide 3 has been moved into its extreme left-hand position in FIG. 1, and its locking contour 3a has released the locking studs 14, so that the frame 6 is freely movable.

Figure 2:
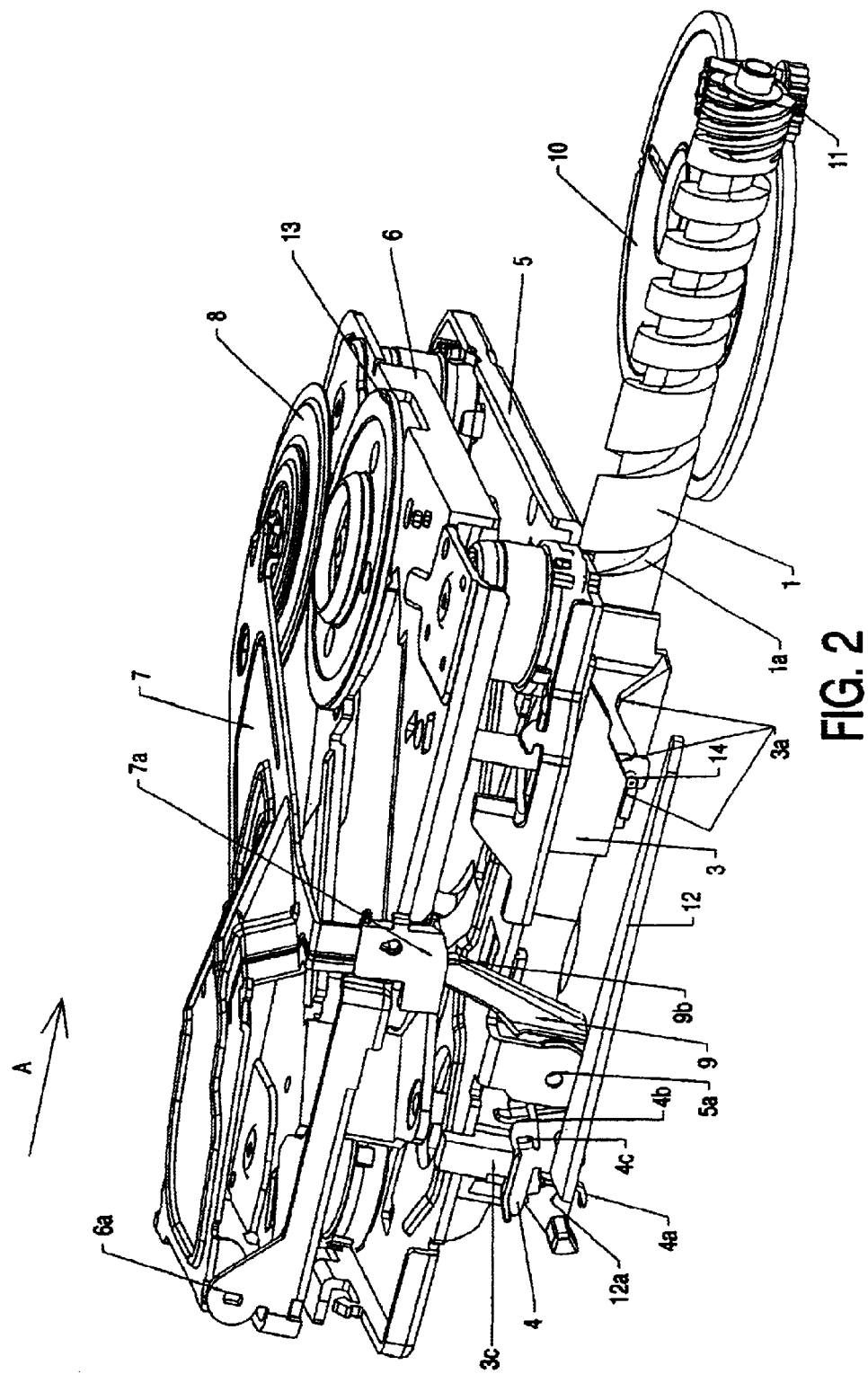
FIG. 2 is a further perspective view of the drive unit.

In FIG. 2, the drive unit is locked to a locking contour 12 which forms part of the device, while a CD (not shown) is not pressed home onto the turntable by the pressure device. For this purpose, the control slide has been displaced some distance in the direction of the arrow A through rotation of the worm gear 1, so that the slope 3b of the control slide 3 was moved against the operational track 9a of the opening lever 9, with the result that the latter lifts the pressure bracket 7 through contact of the lifting arm 9b with the lifting block 7a. The locking studs 14 fastened to the frame 6 were moved along the locking contour 3a of the control slide 3 thereby, so that the frame 6 is pulled in downward direction in the picture, and the free movement of the frame 6 is prevented, which safeguards a sufficiently accurate positioning of the frame 6 for the purpose of laying a CD on the turntable. The mutually opposed movements of the frame 6 and the pressure disc 8 lead to a sufficiently wide gap between the turntable 13 and the pressure disc 8 for the CD to be reliably moved to above the turntable 13.

Figure 3:
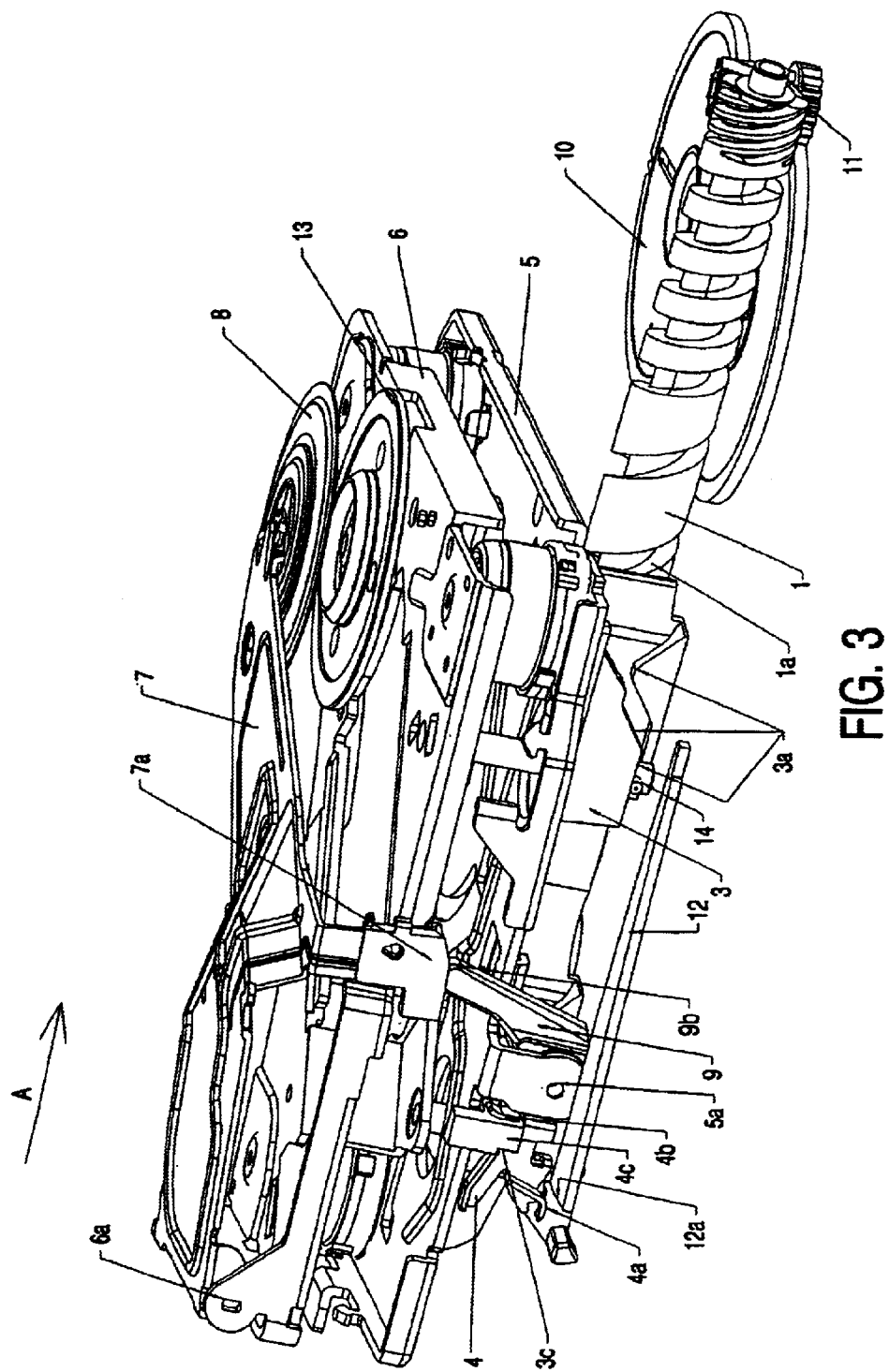
FIG. 3 is a perspective view of a base plate in a playback unit.
Figure 4:
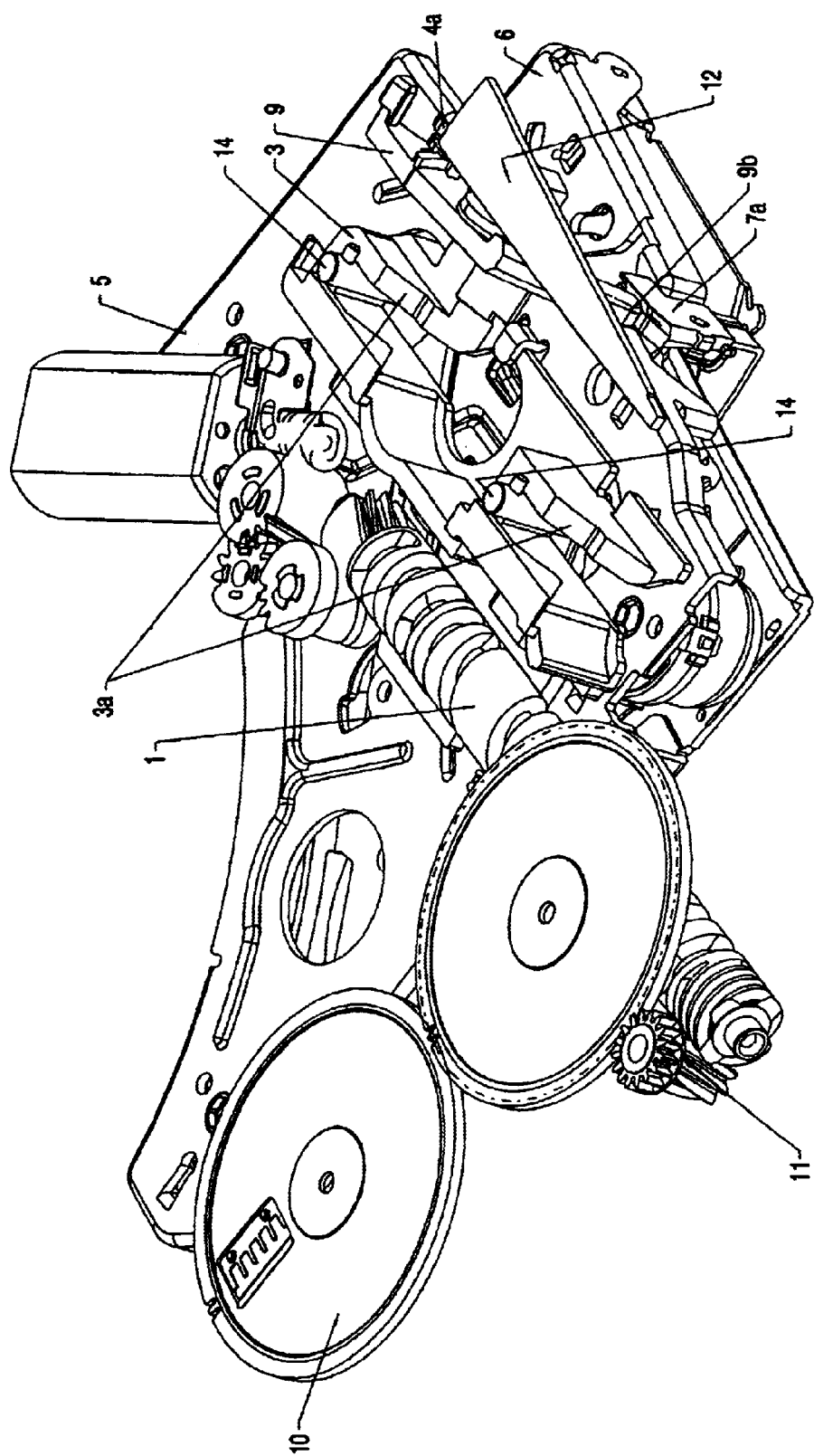
FIG. 4 is a perspective view from below of the drive

A further setting of the drive unit is shown in FIG. 3, where the catch 4 is in a position in which the catch 4 locks the control slide 3 to the base plate 5, while the drive unit is not locked in the device. To achieve this, the control slide 3 was moved some distance further in the direction of the arrow A, so that the carrier 3c of the slide was moved against the locking hook 4b of the catch 4, which was accordingly rotated in clockwise direction in the picture. This causes the rear stop 4c of the catch 4 to pivot behind the locking hook 4b, while the tongue 4a of the catch 4 is lifted from the edge 12a of the locking contour 12, so that the locking of the drive unit in the device in the direction of the arrow A is eliminated, which has the result that a further movement of the control slide in the direction of the arrow A will take along the playback unit, and the tongue 4a of the catch 4 will come to lie on the surface of the locking contour 12. The carrier 3c of the control slide now lies in a window formed by the locking hook 4b and the rear stop 4c of the catch. This has the result that the playback unit will follow the movement of the control slide in both directions until the tongue 4a of the catch 4 slides off the edge 12a of the locking contour 12 again in the case of a displacement of the control slide opposed to the direction of the arrow A.

The displacement of the playback unit will now be described. This operation is achieved by means of the rotatable worm gear 1 in that this gear 1 has thread turns 1a into which a tappet (not shown) serving for the transport of the playback unit engages, which tappet forms part of a control slide 3 which is fixedly locked to the playback unit by a catch 4 or can alternatively be uncoupled therefrom in a defined position of the playback unit in the device, in which case the catch 4 provides a locking of the playback unit in this position in the device, so that the playback unit will remain in place in spite of the worm gear 1 rotating, and the control slide 3 can be displaced further, so that the locking between the base plate 5 and the frame 6 as well as the adjustment of the pressure device comprising the pressure bracket 7, pressure disc 8, and opening lever 9 is controlled. The thread turns 1a of the worm gear have been divided here into several regions having different slopes. The positioning accuracy is improved here by regions of small inclination, while a locking of the playback unit can be realized by regions without any slope of the turns 1a. An increase in the speed of movement from one position into another can be optimized by a region of steep slope. The control of the position of the playback unit can be monitored in a simple manner by means of a shaft encoder switch 10 which is coupled to the rotary movement of the spindle via a drive 11.

This construction renders possible a compact arrangement of the necessary switches, which is not possible in the case of comparatively long displacement paths of the playback unit with switches which ascertain the position of the playback unit directly.

What is claimed is:

1. A device for playing and storing several disc-shaped data carriers to be operated alternately, in particular CDs, CD-ROMs, and DVDs, with a playback unit designed for playing the data carrier and comprising a base plate (5) and a frame (6) which are coupled to one another by means of springs and/or dampers, and comprising a turntable (13) arranged on the frame (6) and designed for accommodating the data carrier and a pressure device for pressing the data carrier onto the turntable (13), while a stacking unit is provided for the intermediate storage of several data carriers, and a loading device is provided for the bidirectional transport of the data carrier between the stacking unit and the playback unit as well as for moving the data carrier into and out of the device, wherein the playback unit is movable by means of a worm gear (1) and can be locked in several positions, characterized in that the worm gear (1) comprises a continuous thread (1a) with several ranges having different thread slopes suitable for varying the speed of the translatory movements in dependence on the position of the playback unit at a constant worm gear rotation speed, or even stopping said movements completely.

2. A device as claimed in claim 1, with a switch for electronic position detection which is integrated in the drive mechanism of the worm gear (1), or is controlled by the worm gear (1) or is controlled by the displacement of a control slide (3).

3. A device as claimed in claim 1, comprising a retaining catch (4); and a control slide (3); wherein the playback unit is adapted to use the retaining catch to alternately inhibit and release the movement of the control slide (3) relative to the playback unit; and/or to alternately inhibit and release the movement possibility of the playback unit relative to the entire device.

4. A device as claimed in claim 1, further comprising a control slide (3) having contours, which control the pressure device for the data carrier in the case of a movement relative to the playback-unit;

inhibit the movement possibility between the base plate and the frame plate, which is limited by the spring-damper system only; and reduce the distance between the base plate (5) and the frame (6).

5. A device for playing and storing several disc-shaped data carriers to be operated alternately, in particular CDs, CD-ROMs, and DVDs, with a playback unit designed for playing the data carrier and comprising a base plate (5) and a frame (6) which are coupled to one another by means of springs and/or dampers, and comprising a turntable (13) arranged on the frame (6) and designed for accommodating the data carrier and a pressure device for pressing the data carrier onto the turntable (13), while a stacking unit is provided for the intermediate storage of several data carriers, and a loading device is provided for the bidirectional transport of the data carrier between the stacking unit and the playback unit as well as for moving the data carrier into and out of the device, wherein the playback unit is movable by means of a worm gear (1) and can be locked in several positions, wherein a control slide (3) is displaced by the thread (1a) of the worm gear (1), which slide (3) can be locked to the playback unit, so that the control slide (3) and the playback unit are jointly moved by the thread (1a) of the worm gear (1), and the playback unit itself is retained by interlocking shapes in the device when the locking between the control slide (3) and the playback unit is lifted, while the control slide (3) still remains movable on its own and can accordingly be displaced relative to the playback unit, performing switching functions inside the playback unit.

6. A device as claimed in claim 5, with a retaining catch (4) for the control slide (3) and the playback unit which is constructed such that it alternately inhibits and releases the movement of the control slide (3) relative to the playback unit or the movement possibility of the playback unit relative to the entire device.

7. A device as claimed in claim 6, wherein the control slide (3) has a contour which controls the retaining catch (4) in the case of a movement relative to the playback unit.

8. A device as claimed in claim 4, wherein the control slide (3) has contours, which control the pressure device for the data carrier in the case of a movement relative to the playback unit;

inhibit the movement possibility between the base plate and the frame plate, which is limited by the spring-damper system only, and reduce the distance between the base plate (5) and the frame (6).

9. A device as claimed in claim 5, wherein the control slide (3) has contours, which control the pressure device for the data carrier in the case of a movement relative to the playback unit;

inhibit the movement possibility between the base plate and the frame plate, which is limited by the spring-damper system only; and reduce the distance between the base plate (5) and the frame (6).

10. A device as claimed in claim 5, with a switch for electronic position detection which is integrated in the drive mechanism of the worm gear (1), or is controlled by the worm gear (1), or is controlled by the displacement of the control slide (3).

11. A device for playing and storing several disc-shaped data carriers to be operated alternately, in particular CDs, CD-ROMs, and DVDs, with a playback unit designed for playing the data carrier and comprising a base plate (5) and a frame (6) which are coupled to one another by means of springs and/or dampers, and comprising a turntable (13) arranged on the frame (6) and designed for accommodating the data carrier and a pressure device for pressing the data carrier onto the turntable (13), while a stacking unit is provided for the intermediate storage of several data carriers, and a loading device is provided for the bidirectional transport of the data carrier between the stacking unit and the playback unit as well as for moving the data carrier into and out of the device, wherein the playback unit is movable by means of a worm gear (1) and can be locked in several positions, further comprising a control slide (3) having contours, which control the pressure device for the data carrier in the case of a movement relative to the playback unit and which inhibit the movement possibility between the base plate and the frame plate, which is limited by the spring-damper system only, and which contours reduce the distance between the base plate (5) and the frame (6).

12. A device as claimed in claim 11, further comprising a retaining catch for the control slide, wherein the control slide (3) has a contour which controls the retaining catch (4) in the case of a movement relative to the playback unit.

13. A device as claimed in claim 11, with a switch for electronic position detection which is integrated in the drive mechanism of the worm gear (1), or is controlled by the worm gear (1), or is controlled by the displacement of the control slide (3).

14. A positioning mechanism, in particular for a device for playing and storing several disc-shaped data carriers for alternate operation, wherein the playback unit is displaceable by means of a worm gear (1) and can be locked in several positions, wherein the worm gear (1) comprises a continuous thread (1a) with several ranges having different thread slopes suitable for varying the speed of translatory movements in dependence on the position of the playback unit at a constant worm gear rotation speed, or even stopping said movements completely.

15. A positioning mechanism comprising

A playback unit adapted to alternate playback between data carriers, the playback unit comprising means for accommodating at least one carrier) the accommodating means being responsive to retrieval of the at least one carrier from a stacking unit that is adapted for storage of several carriers; and translating means, including a worm gear, adapted
  to move the playback unit relative to the stacking unit; and
  to lock the playback unit in several positions, which worm gear defines a central axis that is disposed substantially parallel to a playback surface of the at least one carrier when that carrier is in the accommodating means
wherein the worm gear comprises a continuous thread with several ranges having different thread slopes suitable for varying the speed of translatory movements depending, on a position of the playback unit, at a constant worm gear rotation speed.

16. The device of claim 15, wherein the data carriers include CD's, CD-ROM's, and/or DVD's.

17. The device of claim 15, wherein the means for accommodating comprising a turntable and means for holding the carrier in place.

18. The unit of claim 15, wherein the thread is adapted to stop movement of the playback unit at a given translatory position.

19. A positioning mechanism, in particular for a device for playing and storing several disc-shaped data carriers for alternate operation, wherein a playback unit is displaceable by means of a worm gear (1) and can be locked in several positions,
  wherein a control slide (3) is displaced by a thread (1a) of the worm gear (1), which slide (3) can be locked to the playback unit, so that the control slide (3) and the playback unit are jointly moved by the thread (1a) of the worm gear (1), and the playback unit itself is retained by interlocking shapes in the device when the locking between the control slide (3) and the playback unit is lifted, while the control slide (3) still remains movable on its own and can accordingly be displaced relative to the playback unit, performing switching functions inside the playback unit.

20. A positioning mechanism, in particular for a device for playing and storing several disc-shaped data carriers for alternate operation, wherein a playback unit is displaceable by means of a worm gear (1) and can be locked in several positions,
  further comprising a control slide (3) having contours, which
    control a pressure device for a data carrier in the case of a movement relative to the playback unit;
    inhibit the movement possibility between a base plate and a frame plate of the playback unit, which is limited by a spring-damper system only, and
    reduce the distance between the base plate (5) and the frame (6).

* * * * *